United States Patent Office 3,112,295
Patented Nov. 26, 1963

3,112,295
EMULSION POLYMERIZATION OF WATER-SOLUBLE WITH WATER-INSOLUBLE MONOMERS
Carl S. Marvel, Urbana, Ill., assignor to E. I. du Pont de Nemours and Company, Wilmington, Del., a corporation of Delaware
No Drawing. Filed Mar. 5, 1959, Ser. No. 797,339
7 Claims. (Cl. 260—85.5)

This invention relates to the copolymerization of vinyl monomers, and more particularly to emulsion polymerization of copolymers containing a major proportion of a water-soluble acrylic monomer and a minor proportion of a water-insoluble mono-ethylenically unsaturated monomer.

In the important field of vinyl polymerization the preparation of copolymers has continually gained in interest because of the desire to combine the advantageous properties of more than one monomeric species in the same products. In some instances two monomers are combined in essentially equal proportions, but the most normal procedure uses one monomer in major amount and one or more additional monomers in minor amount to modify the properties which would be given by the homopolymer of the first constituent.

For optimum product properties, these copolymers should be uniform in composition. For example, in the acrylonitrile field it has been found that uniformity in composition of copolymers containing a major portion of acrylonitrile is particularly important with regard to polymer solubility and elastic responses of fibers prepared from the polymers. Uniformity of composition is likewise important if the softening temperature of the polymer is to be maintained at a high level. In the styrene field it has been found that copolymers of styrene with acrylonitrile, when made in an emulsion system, often contain a fraction of acrylonitrile homopolymer. The presence in the copolymer of a homopolymer of one of the constituents generally results in incompatibility of the two species and, hence, in lack of clarity and impaired physical properties of the product. The problem of poor uniformity of molecular composition is particularly acute where the monomers show strongly different solubilities in the polymerization medium.

Bead polymerization of monomeric mixtures containing a minor portion of a water-soluble monomer such as acrylonitrile and a major portion of a water-insoluble monomer such as vinylidene chloride, in which the relative proportion of the two monomers entering the copolymer is purported to be controlled, has been reported. However, the controlled preparation of homogeneous copolymers in which the water-soluble component predominates has heretofore not been possible by this or other processes. With the water-soluble component predominating, non-uniform polymerization occurs, frustrating attempts to build the desired properties into the final polymeric product. In other known processes for polymerizing the aforementioned monomers, excessive periods of time as well as a high concentration of dispersing agents have been used. However, the proportion of the water-insoluble monomers entering the polymer molecule in relation to the proportion in the monomer mixture has been quite low.

It is, therefore, an object of this invention to provide a process for the preparation of copolymers containing a major proportion of a water-soluble acrylic monomer and a minor proportion of a water-insoluble monoethylenically unsaturated monomer which are uniform in composition. It is a further object of this invention to provide an aqueous emulsion polymerization process whereby the comonomers appear in the copolymer in substantially the same ratio as that in which they are fed to the polymerization reaction. It is a still further object of this invention to provide a process for the polymerization of a highly water-insoluble mono-ethylenically unsaturated monomer which is not otherwise polymerizable with an acrylic monomer having a high degree of water solubility. Still another object of this invention is to provide a process in which polymerization with accompanying high yields of polymer can be accomplished in a relatively short period of time. Other objects will appear hereinafter.

The aforementioned objects are accomplished in a polymerization process which comprises forming an aqueous emulsion consisting of a mixture of copolymerizable monomers containing a water-soluble monomer in a major proportion and a water-insoluble monomer in a minor proportion, a water-dispersible surface-active agent, a water-soluble inorganic salt, and a catalyzing amount of a water-soluble free radical initiator system. The process may be carried out batch-wise or continuously with the comonomers being fed in the ratio desired in the final polymer to a reaction vessel. By controlling the concentration of the salt, a monomer phase and an aqueous phase are formed. A small amount of a surface-active agent, i.e., from about 0.01% to about 0.10% by weight, is conveniently added to the reaction mixture to provide an emulsion in which the droplets of the comonomers are intimately admixed. The initiators which must be soluble in the aqueous phase are uniformly dispersed throughout the emulsion, thereby permitting rapid, uniform catalytic action and copolymerization of both the water-soluble and water-insoluble monomers. Surprisingly, it is found that in many instances the water-insoluble monomer can be made to enter the copolymer molecule at an even greater rate than the water-soluble monomer. This is particularly significant since in most prior art processes the water-insoluble monomer does not enter the polymer when the polymerization is carried out in aqueous solution or in normal aqueous emulsion. In addition, by the process of this invention the molecular weight of the copolymer can be readily controlled.

By "water-soluble acrylic monomers" it is meant those acrylic monomers having water solubility of at least 5% at the polymerization temperature. By "water-insoluble mono-ethylenically unsaturated monomers" it is meant those monomers which have a water-solubility of less than about 0.5% at the polymerization temperature. The polymerization temperature may be varied from about zero to the boiling point of the reaction mixture.

The process of this invention is particularly useful in the preparation of copolymers containing a major portion of acrylonitrile, especially those having an acrylonitrile content above about 70%. Such polymers have highly advantageous properties which are valuable in the preparation of films, filaments, and the like. Other water-soluble acrylic acid monomers such as acrylic acid, its alkyl esters, nitriles, amides, and water-soluble homologues and isomers thereof, may be substituted for acrylonitrile as will be more fully described later herein.

The water-insoluble mono-ethylenically unsaturated monomer may be, e.g., a long-chain alkyl ester of acrylic acid, the vinyl ester of an aliphatic acid, or hydrocarbons containing ethylenic unsaturation.

The choice of an inorganic salt to be used in the reaction is not critical. It should be inert to the polymerization action, i.e., does not react with the monomers used or with the initiator system. In addition, the salt solution should not be a solvent for the polymer formed. Inorganic salts which are soluble in water to the extent of at least about 10% at about 25° C. are most useful. The neutral and acid salts of alkali metals, e.g., sulfates, halides and nitrates, as well as ammonium halides, may be used. Sodium sulfate has been found to be particularly useful in that it contains ions normally present in the polymerization medium as a result of the interaction of the preferred initiator system of potassium persulfate and sodium metabisulfite. Concentrations between about 5% and about 80% of the inorganic salt, based on the total weight of salt and water in the reaction mixture, may be used. The concentration will, of course, vary depending on the reaction conditions and desired composition of the final product. The amount of water-insoluble component appearing in the final product can be adjusted upward by increasing the concentration of the salt in the reaction medium. This is surprising since it is generally believed that the monomer reactivity ratios are independent of the polymerization medium.

The initiator system which may be used in the process of this invention is not critical except that it must be water soluble and substantially insoluble in each of the monomers being polymerized. Any water-soluble free radical initiator system meeting these requirements may be used.

The invention will be further illustrated but is not intended to be limited by the following examples in which parts and percentages are given by weight unless otherwise indicated.

*Example I*

Acrylonitrile and lauryl methacrylate were copolymerized by a continuous procedure in a stirred vessel fitted with an overflow line and blanketed with nitrogen gas. Ingredients were continuously added in the following proportions:

| | | |
|---|---|---|
| Acrylonitrile | parts | 85 |
| Lauryl methacrylate | do | 15 |
| Water | do | 400 |
| Sodium sulfate | do | 50 |
| Sodium lauryl sulfonate | do | 0.2 |
| Sodium metabisulfite | do | 1.5 |
| Potassium persulfate | do | 0.75 |
| Iron (as ferrous ammonium sulfate) | p.p.m. | 10 |

In addition, a quantity of sulfuric acid sufficient to maintain the pH at 3.25 was continuously fed in. The reactor contents were maintained at 48° C. and the residence time was eighty minutes.

After four hours of continuous operation, a sample of the effluent product was filtered, washed and dried. It was found to have an intrinsic viscosity of 1.50 and, according to the analysis for carbonyl groups by the infrared method the resulting polymer was found to contain 15.2% of lauryl methacrylate. The weight of this polymer and the weight of the effluent slurry from which it was filtered showed that the percent conversion in the polymerization was 75%. Samples of polymer separated after one, two, and three additional hours of polymerization were found to contain between 14.8% and 15.2% lauryl methacrylate.

*Example II*

A batch polymerization was carried out using the following ingredients:

| | Grams |
|---|---|
| Acrylonitrile | 45 |
| Lauryl acrylate | 5 |
| Water | 750 |
| Sodium sulfate | 150 |
| Potassium persulfate | 0.4 |
| Sodium metabisulfite | 0.8 |
| Sodium lauryl sulfate | 0.2 |

The sodium lauryl sulfate, anhydrous sodium sulfate, and sodium metabisulfite were dissolved in 740 grams of deionized water in a 2000-ml. beaker. The solution was warmed to 45° C. and adjusted to a pH of 3.2 by addition of 2 N sulfuric acid. The solution was then transferred to a 3-neck round-bottom flask equipped with a stirrer, a nitrogen inlet and a condenser, and kept in a water bath at 48±1° C. Nitrogen gas was passed over the surface of the liquid for ten minutes. After that time, the acrylonitrile and lauryl acrylate were added, followed by a solution of the potassium persulfate in 10 grams of deionized water. The flow of nitrogen gas was continued and the mixture was polymerized for a total of ninety minutes with stirring. The resulting polymer was filtered off and washed with warm water to remove sodium sulfate. It was then slurried twice with acetone, filtered, and dried in a steam oven at 80° C. Twelve (12) grams of the polymer were obtained. Analysis for carbonyl groups by the infrared method indicated that the resulting polymer contained 35% polymerized lauryl acrylate. Thus, with 16.7% concentration of sodium sulfate in water as the polymerization medium, the incorporation of lauryl acrylate into a copolymer with acrylonitrile was three and one-half times the concentration of this monomer in the monomer mixture. This utilization of the monomer was found when the conversion of monomer to polymer was purposely kept low so that each monomer was present in good supply throughout the polymerization.

When the polymerization was repeated with the addition of 10 p.p.m. of iron in the form of ferrous ammonium sulfate in the original aqueous solution, 90% conversion of monomer to polymer was reached in ninety minutes. In this case, the polymer contained 10.5% lauryl acrylate. The polymer composition closely approached that of the feed composition.

The original polymerization was repeated with the exception that the anhydrous sodium sulfate was omitted from the recipe. Analysis of the product showed it to contain less than 2% lauryl acrylate.

*Example III*

The following mixture was polymerized according to the procedure of Example II:

| | | |
|---|---|---|
| Acrylontrile | grams | 45 |
| Lauryl acrylate | do | 5 |
| Water | do | 750 |
| Sodium sulfate | do | 100 |
| Potassium persulate | do | 0.4 |
| Sodium metabisulfite | do | 0.8 |
| Sodium lauryl sulfate | do | 0.2 |
| Iron (as ferrous mannomium sulfate) | p.p.m. | 10 |

Samples of polymer were removed after thirty, sixty, and ninety minutes polymerization time. The percent conversion was 25%, 75%, and 91%, respectively, at the three samplings. Each sample was separated by filtration and was then washed first with water and then with acetone and dried at 80° C. Each sample was found to contain about 5–6% of polymerized lauryl acrylate according to infrared analysis.

*Example IV*

A number of polymerizations were carried out according to the procedure of Example II. The amount of sodium metabisulfite, potassium persulfate, sodium lauryl sulfate, and water were in all cases identical with those used in Example II. The amount of monomer mixture used was in all cases 50 grams, as in Example II. The individual monomers and their weights were, however, different. For each monomer mixture, one polymerization was carried out in the presence of 150 grams of sodium sulfate and a second polymerization was carried out in the absence of that salt. No ferrous ammonium sulfate was added. This material was omitted so that the percentage conversion would be low in all cases in order to illustrate the effect of the salt concentration on the composition of the polymerized product.

In the first set of experiments, the monomeric mixture consisted of 15 grams of styrene and 35 grams of acrylonitrile. With this blend of monomers the polymerization carried out in the absence of sodium sulfate produced a product having a 3/97 styrene/acrylonitrile composition. The yield was 20%. When the experiment was carried out in the presence of sodium sulfate, 41% conversion and a product having a composition of 25/75 styrene/acrylonitrile was obtained.

In the second set of experiments, a blend of 35 grams acrylic acid and 15 grams octyl acrylate was used. The percent conversions were about 19% in the absence of sodium sulfate and about 38% in the presence of sodium sulfate. The compositions were 97/3 and 35/65 acrylic acid/octyl acrylate, in the absence and the presence of sodium sulfate, respectively.

Polymerizations were carried out using a blend of 30 parts of acrylamide and 20 parts of stearyl methacrylate. The amount of stearyl methacrylate found in the polymer prepared in the absence of salt was less than 2%, whereas the amount of this material in the polymer prepared in the presence of sodium sulfate was 71%. Conversion was below 32% in each case.

Polymerizations were carried out with a blend of 45 grams of acrylonitrile and 5 grams acenaphthylene. The percentage of acenaphthylene incorporated into the polymer was increased from 0% to 8% by the inclusion of salt in the polymerization medium.

It will be obvious that in each of these experiments the presence of a sizable concentration of inorganic salt in the aqueous medium resulted in increased utilization of the less water-soluble of the two monomers in the monomer mixture being polymerized.

*Example V*

In this series of experiments the polymerization of Example II was repeated except that a different inorganic salt was used in place of the sodium sulfate of that example and a different surface-active agent was used in place of the sodium lauryl sulfate.

In the first experiment, 150 grams of potassium chloride and 0.2 gram of sodium cetyl sulfonate were used.

In the next experiment, 150 grams of sodium bromide and 0.2 gram of sodium polymethacrylate were used.

In the next experiment, 150 grams of ammonium sulfate and 0.2 gram of the sodium salt of sulfonated cumar resin were used.

In the next experiment, 150 grams of calcium nitrate and 0.2 gram of the sodium salt of isopropylated naphthalene sulfonic acid were used.

In the final experiment of this set, 150 grams of potassium bisulfite and 0.2 gram of the sodium salt of sulfonated paraffin white oil were used.

Each of these polymerizations were carried out for ninety minutes at 48° C., and the conversion in each case was found to be between 20% and 35%. The amount of lauryl acrylate incorporated into the polymer was between 20% and 40% in all cases. Comparison of these results with the control experiment of Example II, in which no inorganic salt was added to the polymerization, shows that any unreactive soluble inorganic salt may be used in combination with any salt-stable surface-active agent to produce the benefits of this novel polymerization process.

The preceding examples illustrate the usefulness of this invention in the copolymerization of relatively water-insoluble monomers with monomers which are soluble in water. In addition to those water-soluble monomers previously described, other acrylic acids such as methacrylic acid, salts of acrylic and methacrylic acid, and substituted acrylic acids such as benzoyl and halide-substituted acrylic acids, may be substituted for those in the examples. Likewise, the water-soluble substituted acrylamides such as N-acrylyl-N'-succinyl adipamide and N-(4'-benzanilide) acrylamide, as well as others, may be used. Mixtures of the aforementioned acrylic monomers are also useful.

The water-insoluble mono-ethylenically unsaturated monomers of greatest interest are the long-chain acrylic acid esters such as the butyl esters and those of higher aliphatic alcohols such as octyl, lauryl, and stearyl esters of acrylic and methacrylic acid and the vinyl esters of aliphatic acids having at least four carbon atoms in the acid residues such as vinyl butyrate, vinyl caproate, etc. In addition, aliphatic and aromatic water-insoluble hydrocarbons containing ethylenic unsaturation such as isobutylene, styrene, acenaphthylene, and the like, may be readily polymerized by the process of this invention.

In addition to the aforementioned water-soluble initiator system, any of the known redox initiator systems, e.g., the ammonium and alkali salts of perboric acid, hydrogen peroxide, peracetic acid, urea-peroxide, perdisulfuric acid, and the like, may be used. Other oxygen-containing sulfur compounds such as sulfur dioxide, sodium hydrosulfite, sodium thiosulfate, sodium sulfite, and diethyl sulfite may be substituted for the sodium metabisulfite. In a preferred adaptation of this invention, an aqueous solution containing from about 0.1% to about 4% of potassium persulfate and about 0.05% to about 2% of sodium metabisulfite is used. A trace amount of an ionizable heavy metal salt, e.g., ferric chloride, ferric bromide, ferric nitrate, ferric sulfate, certain chromium and copper salts, etc., may be included in the reaction mixture. However, in a normal water supply this is generally not required.

The surface-active agent may be any water-dispersible cationic, anionic, or nonionic surfactant that is not salt-sensitive. Among the anionic agents are the alkali metal salts of the fatty alkyl sulfates, e.g., octyl sulfate, decyl sulfate, lauryl sulfate, myristyl sulfate, and oleyl sulfate; the alkyl aryl sulfonates, e.g., methyl naphthalene sulfonate, ethyl naphthalene sulfonate, isopropyl naphthalene sulfonate, diisopropyl naphthalene sulfonate, butyl naphthalene sulfonate, butyl diphenyl sulfonate, and the like. Suitable cationic surfactants include the fatty alkylol amine condensates, heterocyclic tertiary amines, and quaternary ammonium compounds. Among the nonionic surfactants are the ester- and ether-linked polyethenoxy compounds and the esters of the sugar alcohols, sorbitol and mannitol. The preparation of these and other nonionic surfactants is described in U.S. Patents Nos. 2,322,820 and 2,380,166. The sodium salts of alkyl sulfates have been found to be particularly desirable. The concentration of the surface-active agent used will generally be between about 0.01% and about 0.10%, based on the total weight of ingredients in the reaction mixture including the water.

The operability of the invention is not confined to any particular proportion of polymerizable monomers relative to the amount of aqueous media present. Thus, the ratio of the aqueous to the non-aqueous phase may vary between about 10:1 and 1:1. In general, it is preferred to employ aqueous/non-aqueous ratios between about 4:1 and 2:1 since, for a given reaction vessel, the time-space yield is reduced by the use of higher ratios.

The present invention can be operated at any temperature above the freezing point of the aqueous phase which is somewhat below zero to the boiling point of the solution which, of course, will vary with the pressure. Temperatures from about 25° C. to about 50° C. are preferred.

The process of this invention is carried out in an acid medium in which the pH is maintained between about 2 and about 6. Within this range, the polymerization generally proceeds rapidly with a high yield being attained within a period from about thirty minutes to about two hours. Periods above two hours are generally unnecessary. The optimum conditions for carrying out the polymerization will depend on the particular reaction mixture and may be readily determined by those skilled in the art.

Many advantages accrue from the process of the present invention. The major advantage resides in the fact that this process permits the preparation of uniform copolymers in which the comonomers appear in the final product in substantially the same ratio as that in which they are fed to the polymerization reaction. For example, copolymers containing a predominant amount of acrylonitrile, particularly those containing at least about 85% acrylonitrile, which give films and filaments of high strength, insolubility, and sun resistance, may have introduced into the polymer molecule a predetermined amount of such monomers as octyl acrylate and stearyl acrylate which provide improved dyeability and improved hot-wet properties when compared with acrylonitrile homopolymer and copolymers containing lower alkyl esters. Another advantage of the present invention is that rapid, uniform polymerization is attained without the use of water-insoluble suspension stabilizers which must be removed after polymerization or the use of large amounts of dispersing agents. In addition, an inexpensive initiator system which provides uniform catalysis of both the water-soluble and water-insoluble monomers may be used.

It will be apparent that many widely different embodiments of this invention may be made without departing from the spirit and scope thereof, and therefore it is not intended to be limited except as indicated in the appended claims.

I claim:

1. A process for the production of homogeneous copolymers which comprises preparing a reaction mixture comprised of an aqueous emulsion consisting of a mixture of copolymerizable monomers containing a major proportion of a water-soluble acrylic monomer selected from the group consisting of an acrylic acid and its alkyl esters, nitriles, and amides having a solubility in water of at least 5% at a temperature between 0° C. and the boiling point of said aqueous emulsion and a minor proportion of a copolymerizable water-insoluble monoethylenically unsaturated monomer having a solubility in water of less than about 0.5% at a temperature between 0° C. and the boiling point of said aqueous emulsion, from about 0.01% to about .10% of a water-dispersible surfactant, a catalyzing amount of a water-soluble free-radical catalyst, and from about 5% to about 80% by weight of an inorganic water-soluble salt selected from the group consisting of neutral and acid salts of alkali metals and ammonium halides, based on the total weight of said salt and water in said reaction mixture, aqueous solutions containing from about 5% to about 80% by weight of said salt being non-solvents for said homogeneous copolymers and said salt being inert to said reaction mixture and having a solubility in water of at least 10% at a temperature of about 25° C., said aqueous emulsion having a ratio of aqueous to non-aqueous ingredients from about 10:1 to about 1:1, and polymerizing said acrylic monomer and said monoethylenically unsaturated monomer which maintaining said reaction mixture at a temperature from about 0° C. to its boiling point until said polymerization is completed.

2. The process of claim 1 wherein said temperature is from about 25° C. to about 50° C.

3. The process of claim 1 wherein said mono-ethylenically unsaturated monomer is a long-chain alkyl ester of an acrylic acid, the alkyl group of which contains at least four carbon atoms.

4. The process of claim 1 wherein said acrylic monomer is acrylonitrile and said monoethylenically unsaturated monomer is lauryl methacrylate.

5. The process of claim 1 wherein said mixture of copolymerizable monomers contains at least about 85% acrylonitrile.

6. The process of claim 1 wherein said inorganic water-soluble salt is sodium sulfate.

7. The process of claim 1 wherein said water-dispersible surfactant is selected from the group consisting of alkali metal salts of long-chain alkyl sulfates and sulfonates having twelve to eighteen carbon atoms in the alkyl chain.

References Cited in the file of this patent

UNITED STATES PATENTS

| | | |
|---|---|---|
| 2,462,354 | Brubaker et al. | Feb. 22, 1949 |
| 2,531,196 | Brubaker et al. | Nov. 21, 1950 |
| 2,569,506 | Vandenberg | Oct. 2, 1951 |
| 2,639,279 | Caldwell | May 19, 1953 |
| 2,761,856 | Suen et al. | Sept. 4, 1956 |
| 2,763,636 | Davis | Sept. 18, 1956 |
| 2,775,579 | Erchak et al. | Dec. 25, 1956 |
| 2,974,123 | Ketterer | Mar. 7, 1961 |
| 2,992,209 | Webb et al. | July 11, 1961 |

OTHER REFERENCES

The Van Nostrand Chemist's Dictionary, Van Nostrand Co., Inc., New York (1953), page 8.